(12) United States Patent
He

(10) Patent No.: US 11,089,479 B2
(45) Date of Patent: Aug. 10, 2021

(54) SIGNALING ATTACK PREVENTION METHOD AND APPARATUS

(71) Applicant: HUAWEI TECHNOLOGIES CO., LTD., Shenzhen (CN)

(72) Inventor: Chengdong He, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 272 days.

(21) Appl. No.: 16/288,121

(22) Filed: Feb. 28, 2019

(65) Prior Publication Data

US 2019/0200232 A1 Jun. 27, 2019

Related U.S. Application Data

(63) Continuation of application No. PCT/CN2017/080375, filed on Apr. 13, 2017.

(30) Foreign Application Priority Data

Aug. 31, 2016 (CN) .......................... 201610796695.8

(51) Int. Cl.
*H04W 8/04* (2009.01)
*H04W 12/122* (2021.01)
(Continued)

(52) U.S. Cl.
CPC ....... *H04W 12/122* (2021.01); *H04L 63/1458* (2013.01); *H04W 8/04* (2013.01);
(Continued)

(58) Field of Classification Search
CPC ..... H04W 12/122; H04W 76/11; H04W 8/04; H04W 8/08; H04W 12/67; H04W 84/042;
(Continued)

(56) References Cited

U.S. PATENT DOCUMENTS 9,060,263 B1 * 6/2015 Carames ................. H04W 8/06
2011/0022686 A1 1/2011 Ding
(Continued)

FOREIGN PATENT DOCUMENTS

CN 101448243 A 5/2009
CN 103814583 A 5/2014
(Continued)

OTHER PUBLICATIONS

Concepts in IP Addressing—Non Patent Literature or NPL (https://www.informit.com/articles/article.aspx?p=433329&seqNum=5) dated Dec. 5, 2005 (Year: 2005).*

(Continued)

*Primary Examiner* — Edan Orgad
*Assistant Examiner* — Malick A Sohrab
(74) *Attorney, Agent, or Firm* — Kilpatrick Townsend & Stockton LLP

(57) ABSTRACT

A signaling attack prevention method and apparatus is provided. The signaling attack prevention method can include receiving a Diameter request message sent by a mobility management entity (MME) or a serving general packet radio service (GPRS) support node (SGSN); and determining whether the Diameter request message is received through a roaming interface. When the Diameter request message is received from the roaming interface, the signaling attack prevention method can include determining whether a characteristic parameter of the Diameter request message is valid; and if the characteristic parameter of the Diameter request message is invalid, the method can include discarding Diameter request message or returning, to the MME or the SGSN, a Diameter response message carrying an error code. In this way, a hacker can be effectively prevented from attacking an HSS or an edge node by using each attack path, and communication security is improved.

8 Claims, 9 Drawing Sheets

(51) Int. Cl.
*H04L 29/06* (2006.01)
*H04W 76/11* (2018.01)
*H04W 8/08* (2009.01)
*H04W 12/67* (2021.01)
*H04W 84/04* (2009.01)

(52) U.S. Cl.
CPC .............. *H04W 8/08* (2013.01); *H04W 76/11* (2018.02); *H04L 2463/142* (2013.01); *H04W 12/67* (2021.01); *H04W 84/042* (2013.01)

(58) Field of Classification Search
CPC .............. H04W 12/08; H04L 63/1458; H04L 2463/142; H04L 63/1416; H04L 63/1441
See application file for complete search history.

(56) References Cited

U.S. PATENT DOCUMENTS

| | | | |
|---|---|---|---|
| 2011/0116382 A1* | 5/2011 | McCann | H04L 63/1408 370/241 |
| 2012/0129488 A1 | 5/2012 | Patterson et al. | |
| 2012/0191847 A1* | 7/2012 | Nas | H04L 63/0227 709/224 |
| 2014/0068748 A1* | 3/2014 | Mann | H04L 63/0263 726/11 |
| 2014/0073355 A1* | 3/2014 | Ward | H04W 4/029 455/456.2 |
| 2014/0378129 A1* | 12/2014 | Jiang | H04W 36/14 455/432.1 |
| 2017/0265069 A1* | 9/2017 | Palanigounder | H04L 63/0876 |
| 2018/0109953 A1 | 4/2018 | He | |

FOREIGN PATENT DOCUMENTS

| | | |
|---|---|---|
| CN | 106332067 A | 1/2017 |
| WO | 2013041261 A1 | 3/2013 |
| WO | 2016127583 A1 | 8/2016 |

OTHER PUBLICATIONS

Bhanu Teja E Kotte: "Analysis and Experimental Verification of Diameter Attacks in Long Term Evolution Networks", Dec. 1, 2008, XP055434736, 72 pages.
NGMN Alliance: "5G security recommendations Package #1", 3GPP Draft; NGMN 5G Security Package 1 V1 0, 3rd Generation Partnership Project (3GPP), Jul. 10, 2016, XP051117822, 14 pages.
3GPP TS 33.210 V13.0.0 (Dec. 2015), 3rd Generation Partnership Project; Technical Specification Group Services and System Aspects; 3G security; Network Domain Security (NDS); IP network layer security(Release 13), 24 pages.
3GPP TS 29.272 V14.0.0 (Jun. 2016), 3rd Generation Partnership Project; Technical Specification Group Core Network and Terminals; Evolved Packet System (EPS);Mobility Management Entity (MME) and Serving GPRS Support Node (SGSN) related interfaces based on Diameter protocol(Release 14), 153 pages.
3GPP TS 29.274 V8.0.0:"3rd Generation Partnership Project;Technical Specification Group Core Network and Terminals;3GPP Evolved Packet System (EPS); Evolved General Packet Radio Service (GPRS) Tunnelling Protocol for Control plane (GTPv2-C); Stage 3(Release 8)",Dec. 2008, total 111 pages.
3GPP TS 23.003 V13.6.0 (Jun. 2016),3rd Generation Partnership Project;Technical Specification Group Core Network and Terminals;Numbering, addressing and identification(Release 13),Total 102 Pages.

* cited by examiner

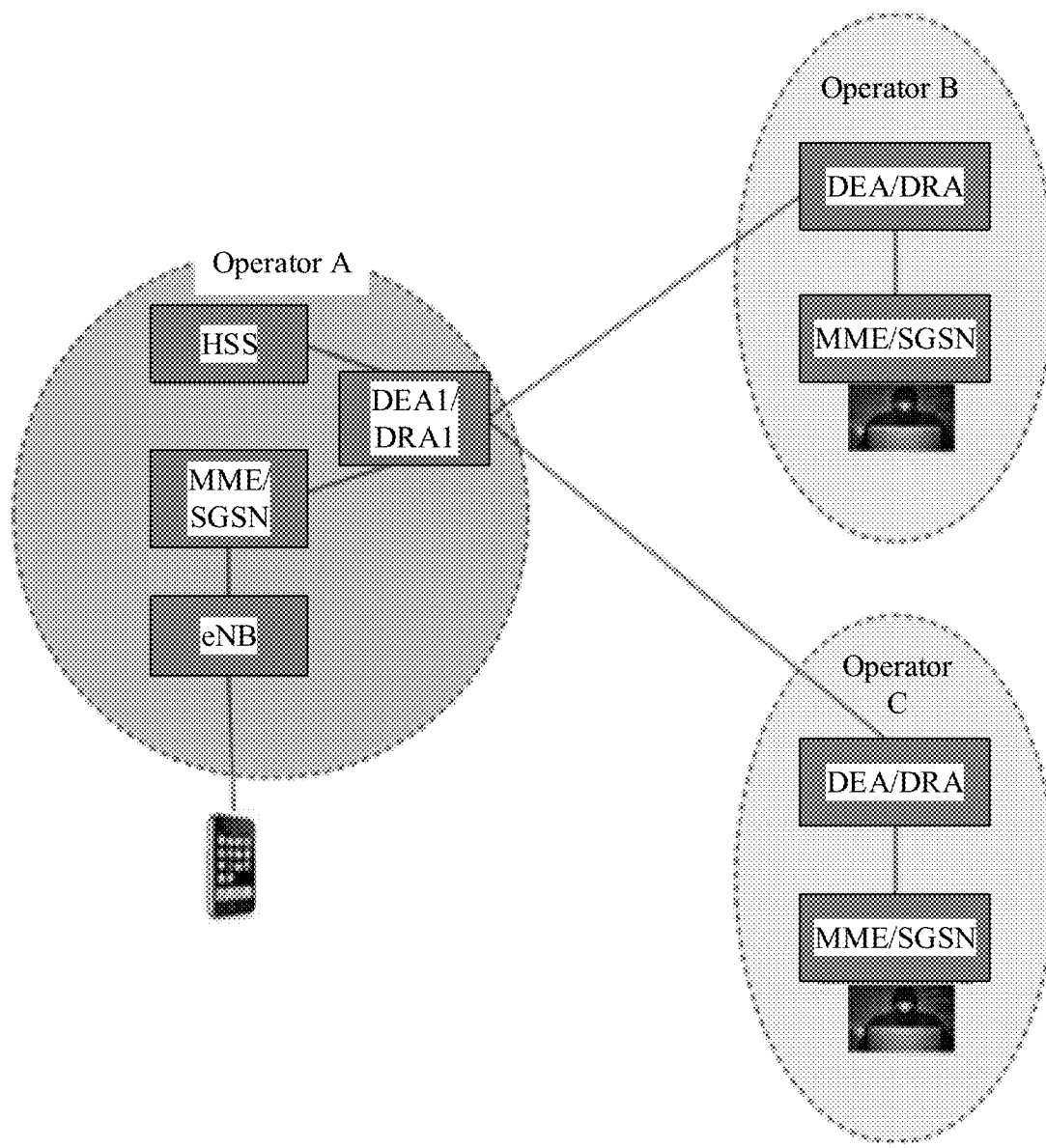
FIG. 2-a

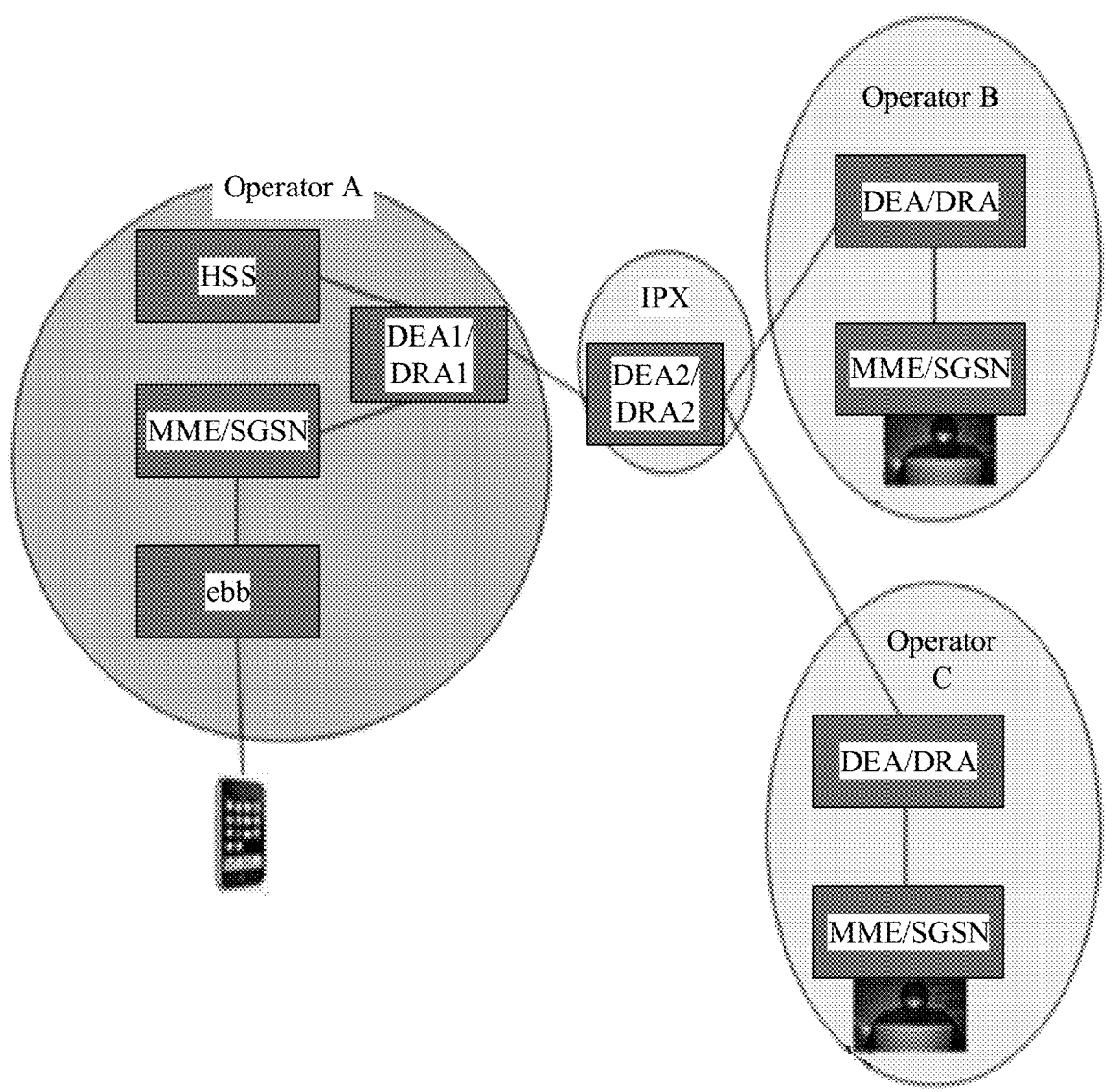
FIG. 2-b

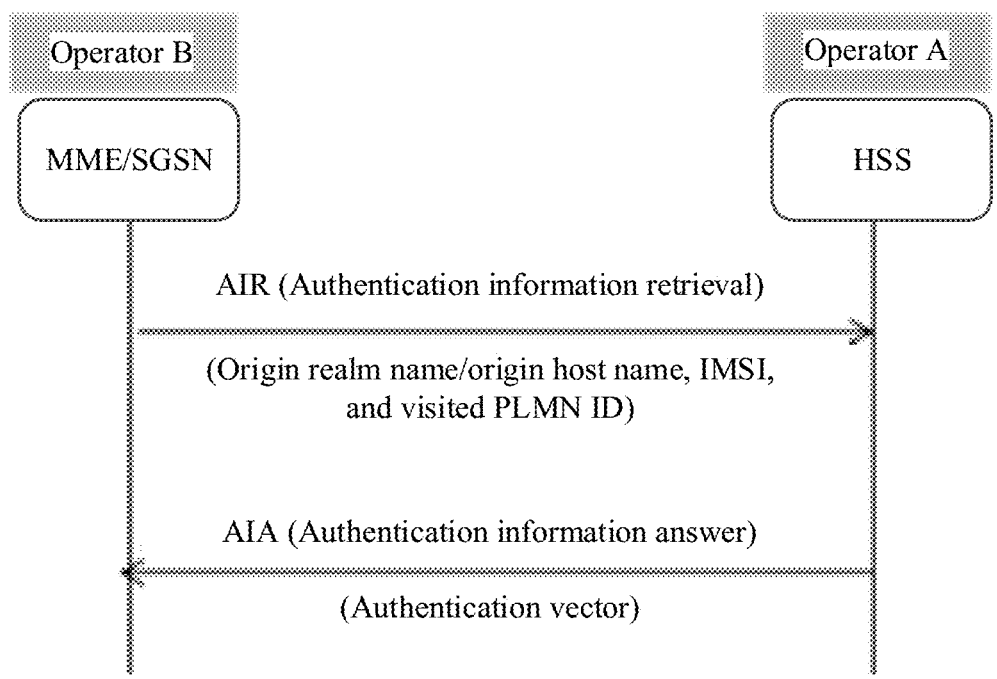
FIG. 3-a

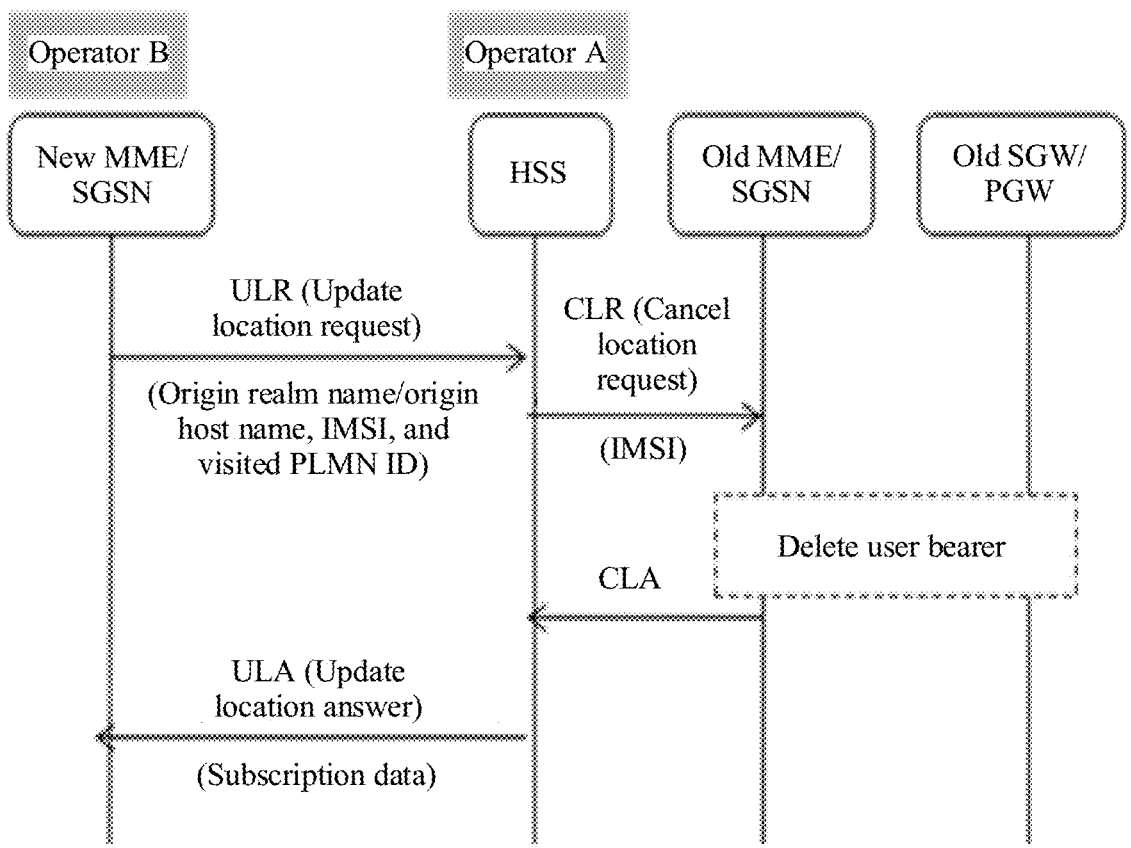
FIG. 3-b

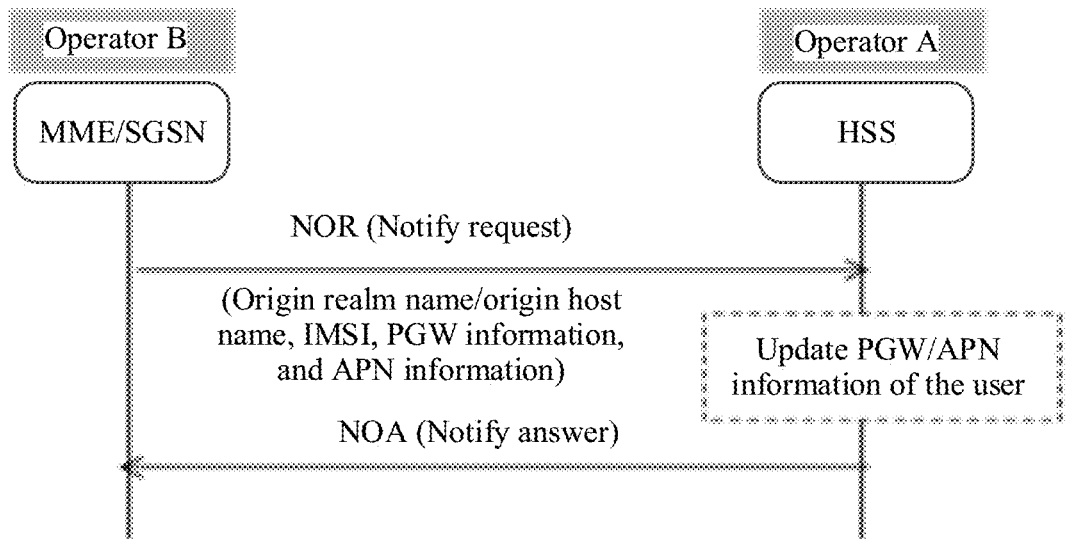
FIG. 3-c
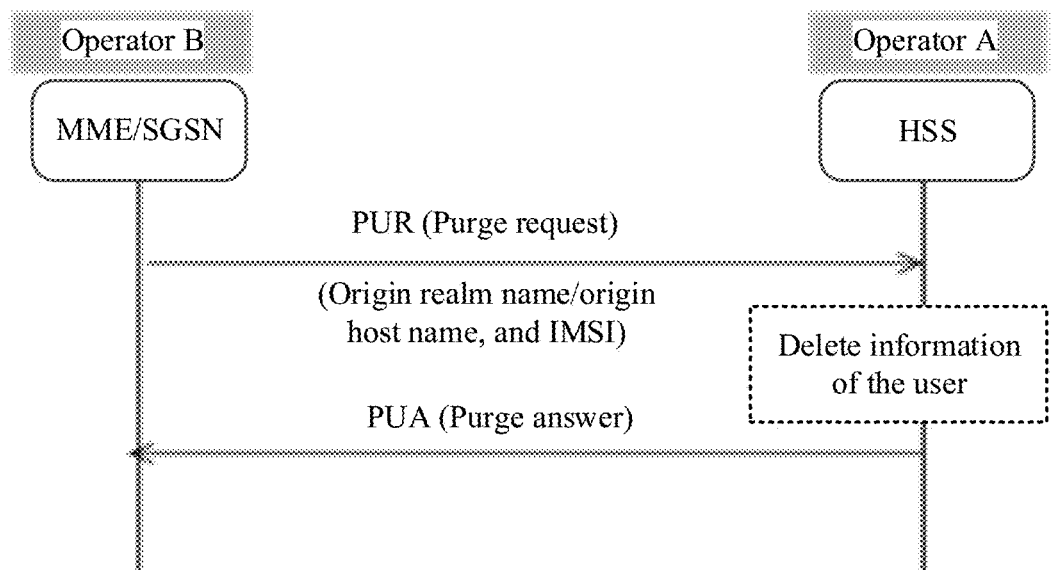
FIG. 3-d

S8 interface protocol stack

SIGNALING ATTACK PREVENTION METHOD AND APPARATUS

CROSS-REFERENCE TO RELATED APPLICATIONS

This application is a continuation of International Application No. PCT/CN2017/080375, filed on Apr. 13, 2017, which claims priority to Chinese Patent Application No. 201610796695.8, filed on Aug. 31, 2016. The disclosures of the aforementioned applications are hereby incorporated by reference in their entireties.

TECHNICAL FIELD

The present invention relates to the communications field, and specifically, to a signaling attack prevention method and apparatus.

BACKGROUND

A mobility management entity (MME), a serving GPRS support node (SGSN), and a home subscriber server (HSS) are important network elements in a mobile communications network. The MME is responsible for signaling processing. The SGSN mainly performs functions such as packet data routing and forwarding, mobility management, and session management. The HSS is used to support a main user database of an IP multimedia subsystem (IMS) network entity used to process an invocation/session.

In a network in the 4th generation mobile communication technology (4G), the MME (SGSN) and the HSS communicate with each other based on the Diameter protocol. In addition, to improve performance in actual networking, one or more Diameter agents, including a Diameter edge agent DEA and a Diameter relay agent DRA, are usually deployed between the MME (SGSN) and the HSS. The edge agent is usually deployed at a border of a network of an operator, and is configured to connect to a device of another operator. When the MME (SGSN) and the HSS do not belong to a same operator, an attacker may modify content at a Diameter layer, resulting in a communication security risk.

SUMMARY

Embodiments of the present invention provide a signaling attack prevention method and apparatus, to prevent a Diameter signaling attack and improve communication security.

According to a first aspect, an embodiment of the present invention provides a signaling attack prevention method. The method includes: receiving, by an HSS or an edge node, a Diameter request message sent by a mobility management entity (MME) or a serving general packet radio service (GPRS) support node (SGSN); determining, by the HSS or the edge node, whether the Diameter request message is received through a roaming interface; when the Diameter request message is received from the roaming interface, determining, by the HSS or the edge node, whether a characteristic parameter of the Diameter request message is valid; and if the characteristic parameter of the Diameter request message is invalid, discarding, by the HSS or the edge node, the Diameter request message or returning, to the MME or the SGSN, a Diameter response message carrying an error code.

In the solution provided in this embodiment of the present invention, the HSS or the edge node determines validity of each parameter in the Diameter request message from the MME/SGSN; and when each characteristic parameter is invalid, the HSS or the edge node discards the Diameter request message or returns, to the MME/SGSN, the Diameter response message carrying the error code, so that a hacker can be effectively prevented from attacking the HSS or the edge node by using each attack path, and communication security is improved.

In a possible design, the characteristic parameter includes a source Internet Protocol (IP) address of the MME or the SGSN, and the determining, by the HSS or the edge node, whether the Diameter request message is received through a roaming interface includes: determining whether the source IP address and an IP address of the HSS or the edge node that receives the Diameter request message belong to a same network segment; and when the source IP address and the IP address of the HSS or the edge node that receives the Diameter request message do not belong to a same network segment, determining, by the HSS or the edge node, that the Diameter request message is received from the roaming interface.

In a possible design, the characteristic parameter includes the source IP address of the MME or the SGSN. The HSS or the edge node determines whether the source IP address belongs to an IP address set authorized by an operator to which the HSS or the edge node belongs. When the source IP address does not belong to the IP address set authorized by the operator to which the HSS or the edge node belongs, the HSS or the edge node determines that the Diameter request message is received from the roaming interface.

In the solution provided in this embodiment of the present invention, by means of determining whether the Diameter request message is received from the roaming interface, attack prevention processing may be performed only on the Diameter request message received by the HSS or the edge node from the roaming interface, so that attack prevention efficiency is improved.

In a possible design, the characteristic parameter includes a mobility management entity origin realm name, and the determining, by the HSS or the edge node, whether a characteristic parameter of the Diameter request message is valid includes: determining, by the HSS or the edge node, whether the mobility management entity origin realm name belongs to a preset mobility management entity origin realm name set; and when the mobility management entity origin realm name does not belong to the preset mobility management entity origin realm name set, determining, by the HSS or the edge node, that the mobility management entity origin realm name in the Diameter request message is invalid. By means of further determining validity of the Diameter request message by using the mobility management entity origin realm name, the attacker may be effectively prevented from launching an attack by using each attack path, and communication security is improved.

In a possible design, the characteristic parameter includes a mobility management entity origin host name, and the determining, by the HSS or the edge node, whether a characteristic parameter of the Diameter request message is valid includes: determining, by the HSS or the edge node, whether the mobility management entity origin host name belongs to a preset mobility management entity origin host name set; and when the mobility management entity origin host name does not belong to the preset mobility management entity origin host name set, determining, by the HSS or the edge node, that the mobility management entity origin host name in the Diameter request message is invalid. By means of further determining validity of the Diameter request message by using the mobility management entity origin host name, the attacker may be effectively prevented from launching an attack by using each attack path, and communication security is improved.

In a possible design, the characteristic parameter includes a visited public land mobile network ID visited PLMN ID, and the determining, by the HSS or the edge node, whether a characteristic parameter of the Diameter request message is valid includes: determining, by the HSS or the edge node, whether the visited PLMN ID belongs to a preset visited PLMN ID set; and when the visited PLMN ID does not belong to the preset visited PLMN ID set, determining, by the HSS or the edge node, that the visited PLMN ID in the Diameter request message is invalid. By means of further determining validity of the Diameter request message by using the visited PLMN ID, the attacker may be effectively prevented from launching an attack by using each attack path, and communication security is improved.

In a possible design, when both the mobility management entity origin realm name and the visited PLMN ID are valid, before the discarding, by the HSS or the edge node, the Diameter request message or returning, to the MME or the SGSN, a Diameter response message carrying an error code, the method further includes: determining, by the HSS or the edge node, whether the mobility management entity origin realm name matches the visited PLMN ID; and when the mobility management entity origin realm name does not match the visited PLMN ID, performing the step of discarding the Diameter request message or returning, to the MME, a Diameter response message carrying an error code. By means of further determining whether the mobility management entity origin realm name matches the visited PLMN ID to further determine validity of the Diameter request message, the attacker may be effectively prevented from launching an attack by using each attack path, and communication security is improved.

In a possible design, the determining, by the HSS or the edge node, whether the mobility management entity origin realm name matches the visited PLMN ID includes: determining, by the HSS or the edge node, whether the mobility management entity origin realm name and the visited PLMN ID have a mapping relationship in a mapping set of preset peer parameters, where the preset peer parameters include the mobility management entity origin realm name and the visited PLMN ID; and when the mobility management entity origin realm name and the visited PLMN ID have no mapping relationship in the mapping set of the preset peer parameters, determining, by the HSS or the edge node, that the mobility management entity origin realm name does not match the visited PLMN ID.

In a possible design, when the mobility management entity origin realm name in the Diameter request message is invalid, the error code indicates that the mobility management entity origin realm name is invalid; when the mobility management entity origin host name in the Diameter request message is invalid, the error code indicates that the mobility management entity origin host name is invalid; when the visited PLMN ID in the Diameter request message is invalid, the error code indicates that the visited PLMN ID is invalid; or when the mobility management entity origin realm name does not match the visited PLMN ID, the error code indicates that parameters do not match. By means of presetting different error codes when different parameters are invalid or do not match, and returning the error codes to the MME/SGSN, the MME/SGSN can accurately identify the attack path of the attacker after receiving the Diameter response message, so as to prevent the attack and improve communication security.

According to a second aspect, an embodiment of the present invention provides a signaling attack prevention apparatus. The signaling attack prevention apparatus has a function of implementing the first aspect, and the function may be implemented by using hardware, or may be implemented by using hardware to execute corresponding software. The hardware or the software includes one or more modules corresponding to the foregoing function.

In a possible design, the signaling attack prevention apparatus may include an HSS.

In a possible design, the signaling attack prevention apparatus may include an edge node.

According to a third aspect, an embodiment of the present invention provides a signaling attack prevention apparatus. The signaling attack prevention apparatus includes a processor, a receiver, and a transmitter. The processor is configured to support a terminal in executing a corresponding function in the foregoing method. The receiver and the transmitter are configured to support the signaling attack prevention apparatus in communicating with an MME/SGSN. Further, a relay device may further include a memory, the memory is configured to couple with the processor, and the memory stores a program instruction and data that are necessary to the terminal.

According to a fourth aspect, an embodiment of the present invention provides a computer storage medium, configured to store a computer software instruction used by the signaling attack prevention apparatus in the second aspect, and the computer storage medium includes a program designed for executing the foregoing aspect.

In comparison with the prior art, in the solutions provided in the embodiments of the present invention, the HSS or the edge node receives the Diameter request message sent by the MME or the SGSN. When the Diameter request message is received from the roaming interface, the HSS or the edge node determines whether the characteristic parameter of the Diameter request message is valid; and when the characteristic parameter of the Diameter request message is invalid, the HSS or the edge node discards the Diameter request message or returns, to the MME or the SGSN, the Diameter response message carrying the error code. Therefore, a hacker can be effectively prevented from attacking the HSS or the edge node by using each attack path, and communication security is improved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

FIG. 2-a is a first networking diagram according to an embodiment of the present invention;

FIG. 2-b is a second networking diagram according to an embodiment of the present invention;

FIG. 3-a is a schematic diagram of a Diameter signaling attack procedure according to an embodiment of the present invention;

FIG. 3-b is a schematic diagram of another Diameter signaling attack procedure according to an embodiment of the present invention;

FIG. 3-c is a schematic diagram of another Diameter signaling attack procedure according to an embodiment of the present invention;

FIG. 3-d is a schematic diagram of still another Diameter signaling attack procedure according to an embodiment of the present invention;

DESCRIPTION OF EMBODIMENTS

Embodiments of the present invention provide a signaling attack prevention method and apparatus, to prevent a Diameter signaling attack and improve communication security.

To make persons skilled in the art better understand the technical solutions in the present invention, the following clearly describes the technical solutions in the embodiments of the present invention with reference to the accompanying drawings in the embodiments of the present invention. Apparently, the described embodiments are merely some of rather than all of the embodiments of the present invention. All other embodiments obtained by persons of ordinary skill in the art based on the embodiments of the present invention without creative efforts shall fall within the protection scope of the present invention.

In the specification, claims, and accompanying drawings of the present invention, the terms "first", "second", "third", and so on are intended to distinguish between different objects but do not indicate a particular order. In addition, the terms "including" or any other variant thereof, are intended to cover a non-exclusive inclusion. For example, a process, a method, a system, a product, or a device that includes a series of steps or units is not limited to the listed steps or units, but In some embodiments further includes an unlisted step or unit, or In some embodiments further includes another inherent step or unit of the process, the method, the product, or the device.

Figure 1:
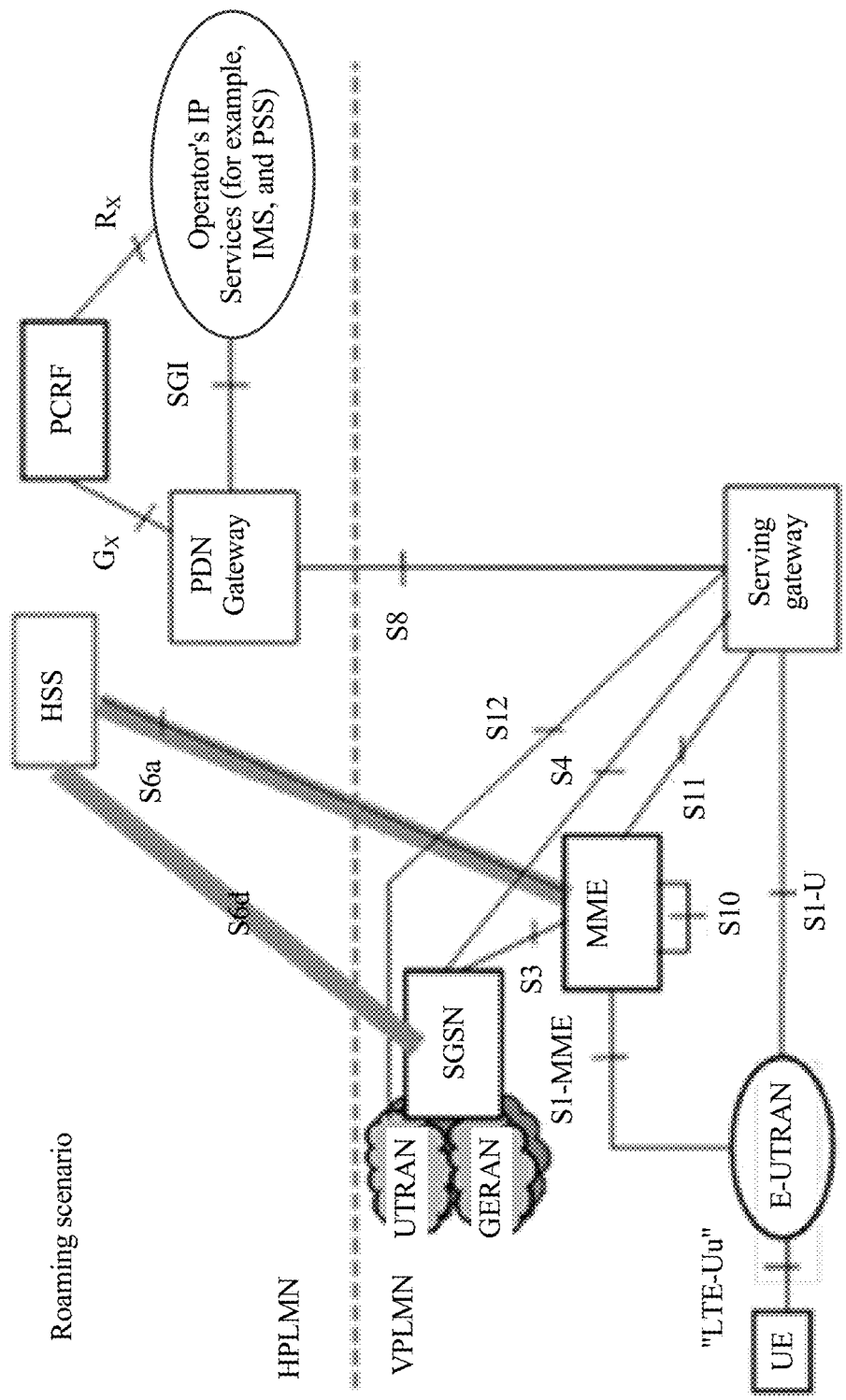
FIG. 1 is a diagram of a network architecture used for communication between an MME (SGSN) and an HSS according to an embodiment of the present invention.

Referring to FIG. 1 first, FIG. 1 is a diagram of a network architecture used for communication between an MME (SGSN) and an HSS according to an embodiment of the present invention. In this embodiment of the present invention, in a 4G network, a protocol for an S6a (S6d) interface between the MME (SGSN) and the HSS is based on the Diameter protocol. In the diagram of the network architecture, after a user accesses the network, the MME (SGSN) that provides a service for the user and the HSS to which the user belongs belong to different operators. This case is referred to as a roaming scenario.

In this embodiment of the present invention, based on the diagram of the network architecture, the MME may send the following information to the HSS: 1. Purge UE, used by the MME (SGSN) to notify the HSS that subscription data of UE is deleted (for example, the reason is that the UE has been inactive for several days); 2. Update location, used by the MME (SGSN) to notify the HSS of a location update (the HSS is notified of an identifier of a currently serving MME), or used by the MME (SGSN) to notify the HSS of terminal information or UE SRVCC information; 3. Authentication information retrieval, used by the MME (SGSN) to obtain authentication data from the HSS; and 4. Notification, used by the MME (SGSN) to notify the HSS that the terminal information or the UE SRVCC information is updated, a dynamically updated PDN changes, and the terminal is reachable or the terminal has sufficient free memory space to receive a short message.

In actual networking, to improve performance, one or more Diameter agents are usually deployed between the HSS and the MME (SGSN). In this embodiment of the present invention, there are two types of Diameter agents: a Diameter edge agent DEA and a Diameter relay agent DRA. The DEA is usually deployed at a border of a network of an operator, and is configured to connect to a device of another operator. For specific networking diagrams, refer to FIG. 2-a and FIG. 2-b. FIG. 2-a is a first networking diagram according to an embodiment of the present invention, and FIG. 2-b is a second networking diagram according to an embodiment of the present invention.

In this embodiment of the present invention, based on the networking diagrams shown in FIG. 2-a and FIG. 2-b, in a 2nd generation mobile communication technology 2G network and a 3rd generation mobile communication technology 3G network, an attacker may attack, by using a roaming interface, a network of another operator that signs a roaming protocol. In a 4G network, when the MME (SGSN) and the HSS (CSS) belong to a same operator, network elements on both sides of an S6a/S6d interface can be controlled by the operator, and therefore, there is no security risk.

However, when the MME (SGSN) and the HSS belong to different operators, for example, the MME (SGSN) belongs to an operator B and the HSS belongs to an operator A that signs the roaming protocol with the operator B, there are security risks as described below.

The operator B may open a network capability of the operator B for a third party, and the third party may attack the HSS of the operator A by using the MME. Alternatively, a malicious insider of the operator B may directly launch the following attacks on the HSS of the operator A by using the MME.

An attack path 1: An AIR message is forged (a visited public land mobile network ID (Visited Public Land Mobile Network ID, Visited PLMN ID for short) parameter is forged) to obtain an authentication vector from the HSS, and consequently: 1. A distributed denial of service (Distributed Denial of Service, DDOS for short) attack is formed to attack the HSS; and 2. In a terminal authentication process, a delay increases, user experience is poor, a sequence number (sequence number, SQN for short) of a universal subscriber identity module (Universal Subscriber Identity Module, USIM for short) card is not synchronized with that in the HSS, and a signaling processing load on a network side (evolved NodeB (evolved Node B, eNB for short)/MME/SGSN/HSS) increases.

In some embodiments, referring to FIG. 3-a, FIG. 3-a is a schematic diagram of a Diameter signaling attack procedure according to an embodiment of the present invention. As shown in FIG. 3-a, the MME/SGSN applies for authentication information from the HSS by using the AIR message. The AIR message carries the visited PLMN ID. The HSS participates in generation of one or more authentication vector sets by using the information, and transmits the authentication vector sets to the MME/SGSN by using the AIR message. In this case, a hacker may fill in an ID of another operator (for example, an operator C) instead of the visited PLMN ID parameter by using the MME/SGSN, so as to obtain the authentication vector without permission. Based on the foregoing attack, the following security risks may be caused:

1. An AIR can be used to apply for a maximum of five authentication vectors at a time, and a central processing unit (Central Processing Unit, CPU)/memory processing resource is consumed in an algorithm used for generating an authentication vector by the HSS. If an attacker sends a large quantity of AIRs within a short period, the DDOS attack is formed to attack the HSS.

2. After the attacker obtains multiple authentication vectors of the terminal (User Equipment, UE for short) by repeatedly attacking, the SQN in the HSS is not synchronized with the SQN of the USIM card in the UE. Consequently, when a serving MME/SGSN on a network side performs authentication on the UE next time, the UE sends an authentication synchronization failure message to the serving MME/SGSN, and the serving MME/SGSN sends an AIR message to the HSS. After synchronizing the SQN with the SQN of the USIM card, the HSS sends an authentication vector to the MME/SGSN again, and the MME/SGSN performs authentication on the UE again, until the authentication succeeds. Therefore, in a UE authentication process, a delay increases, user experience is poor, and a signaling processing load on a network side (eNB/MME/SGSN/HSS) increases.

3. A scenario is as follows: UE of the operator A roams to a network of another operator, and the operators B and C can be selected. Because a tariff of the operator C is high or a service of the operator C is poor, the UE prefers to select the operator B. Because of this vulnerability, the operator C may pretend to be the operator B to apply for an authentication vector, and pretend to be the operator B to complete authentication on the UE, so as to trick a user into a network of the operator C.

An attack path 2: An update location request (Update Location Request, ULR for short) is forged, resulting in disconnection of a user. 1. A visited PLMN ID parameter is forged to be a PLMN ID of another operator, but an origin realm name/origin host name is real. Consequently, the origin realm name/origin host name is inconsistent with the visited PLMN ID. 2. Alternatively, a visited PLMN ID parameter is forged to be a PLMN ID of another operator (for example, the operator A), and an origin realm name/origin host name is also forged to be that of another operator (for example, the operator A). Consequently, the origin realm name/origin host name is consistent with the visited PLMN ID, but is inconsistent with Stream Control Transmission Protocol (Stream Control Transmission Protocol, SCTP for short) link peer information (a peer realm name/a peer host name/a peer Internet Protocol (Internet Protocol, IP for short)/a peer PLMN ID) configured on the HSS.

Specifically, referring to FIG. 3-b, FIG. 3-b is a schematic diagram of another Diameter signaling attack procedure according to an embodiment of the present invention. As shown in FIG. 3-b, after the HSS receives a ULR message of the MME/SGSN: 1. The HSS notifies an old MME/SGSN that the old MME/SGSN no longer serves the user, and the old MME/SGSN deletes a user bearer; 2. The HSS returns subscription data of the user to the new MME/SGSN. In this case, an attacker may forge an origin realm/host parameter and/or a visited PLMN ID parameter in the ULR message to be that of another operator. Therefore, the following security risks may be caused: 1. The user is disconnected (a DOS attack); and 2. User private data is stolen (information leakage).

An attack path 3: An NOR is forged to update IMEI information, PDN-GW information, and APN information in the HSS. The HSS delivers the incorrect information to the MME/SGSN in a ULA, and a user may fail to access a network because an origin realm name/origin host name is forged to be that of another operator.

Specifically, referring to FIG. 3-c, FIG. 3-c is a schematic diagram of another Diameter signaling attack procedure according to an embodiment of the present invention. As shown in FIG. 3-c, after the HSS receives the NOR message: 1. The HSS updates the PGW information and the access point name (Access Point Name, APN for short) information of the user; 2. After receiving a ULR message of the MME/SGSN subsequently, the HSS returns the information to the MME/SGSN by using the ULA. Then, the MME/SGSN fills in an origin realm parameter by using that of another operator (for example, the operator C), and randomly fills in the PGW information and the APN information. Therefore, the following security risk is caused: The user cannot access the network because the PGW information and the APN information are forged.

An attack path 4: A PUR message is forged, and a user is disconnected because an origin realm name/origin host name is forged to be that of another operator. Specifically, referring to FIG. 3-d, FIG. 3-d is a schematic diagram of still another Diameter signaling attack procedure according to an embodiment of the present invention. As shown in FIG. 3-d, after receiving the PUR message, the HSS purges related information of the user. Then, the MME/SGSN may forge an origin realm parameter to be that of another operator (for example, the operator C). Therefore, the following security risk is caused: The user is disconnected.

Figure 4:
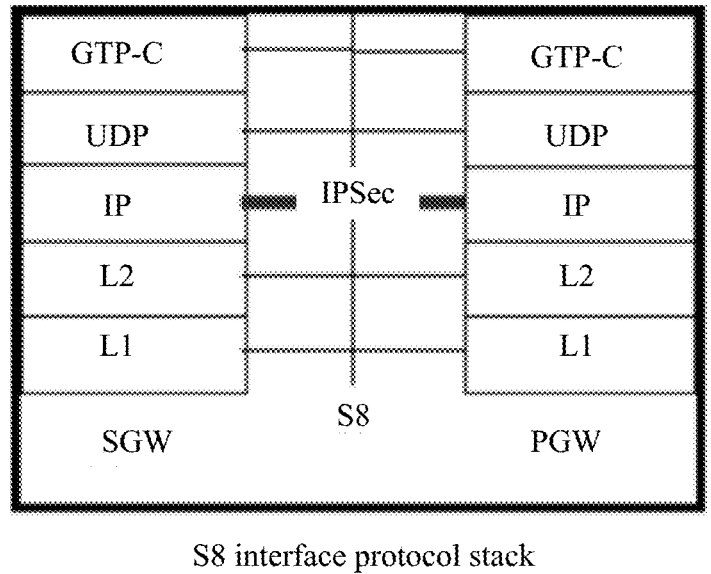
FIG. 4 is a diagram of an S6a/S6d interface protocol stack according to an embodiment of the present invention.

In this embodiment of the present invention, according to specifications in 3GPP standard TS 33.210, IPSec may be deployed on an S6a/S6d interface, to protect security of the S6a/S6d interface, for example, identity authentication between the MME (SGSN) and the HSS, and integrity and confidentiality of data above an IP layer. Referring to FIG. 4, FIG. 4 is a diagram of an S6a/S6d interface protocol stack according to an embodiment of the present invention. However, because the foregoing four attacks belong to attacks at a Diameter signaling layer above the IP layer, even if the identity authentication between the MME (SGSN) and the HSS succeeds, and the integrity and the confidentiality of the data above the IP layer are ensured, the attacker may still launch an attack by sending normal Diameter signaling. Therefore, a conventional IPSec mechanism cannot prevent this attack, and protection for an application layer (such as a Diameter layer) above the IP layer needs to be considered.

Figure 5:
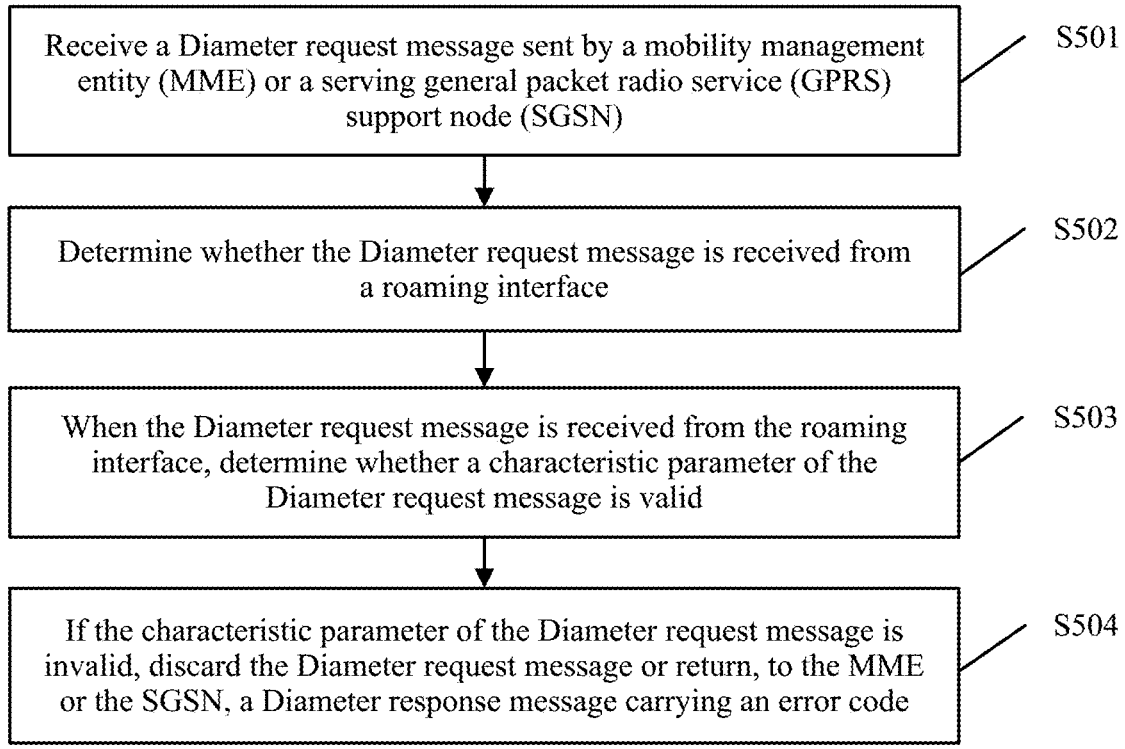
FIG. 5 is a schematic flowchart of a signaling attack prevention method according to an embodiment of the present invention.

Referring to FIG. 5, FIG. 5 is a schematic flowchart of a signaling attack prevention method according to an embodiment of the present invention. As shown in FIG. 5, the method may include the following steps.

S501. Receive a Diameter request message sent by a mobility management entity (MME) or a serving general packet radio service (GPRS) support node (SGSN).

In this embodiment of the present invention, the Diameter request message sent by the MME/SGSN may be received by an HSS and/or an edge node.

The edge node refers to a firewall that is located at a border of a security domain and that communicates with network elements in two neighboring security domains. For example, the edge node may be a DEA1/DRA1 in FIG. 2-*a*, or a DEA1/DRA1 or a DEA2/DRA2 in FIG. 2-*b*.

Specifically, in this embodiment of the present invention, the Diameter request message may be at least one of the following messages:

an authentication information retrieval AIR message, an update location request ULR message, a notify request NOR message, or a purge request PUR message.

S502. Determine whether the Diameter request message is received through a roaming interface.

In this embodiment of the present invention, an attacker attacks the HSS by modifying a related parameter in the Diameter request message when the HSS and the MME/SGSN do not belong to a same operator. When the HSS and the MME/SGSN do not belong to a same operator, the HSS or the edge node performs communication by using the roaming interface. Therefore, to prevent the foregoing attacks, only validity of the Diameter request message received from the roaming interface needs to be determined. When the HSS and the MME/SGSN belong to a same operator, that is, when a message is received from another non-roaming interface, security determining is not required.

In some embodiments, in an embodiment of the present invention, the characteristic parameter includes a source Internet Protocol (IP) address of the MME or the SGSN.

The determining whether the Diameter request message is received through a roaming interface includes:

determining whether the source IP address and an IP address of a home subscriber server (HSS) or an edge node that receives the Diameter request message belong to a same network segment; and when the source IP address and the IP address of the HSS or the edge node that receives the Diameter request message do not belong to a same network segment, determining that the Diameter request message is received from the roaming interface; or determining whether the source IP address belongs to an IP address set authorized by an operator to which the HSS or the edge node belongs; and when the source IP address does not belong to the IP address set authorized by the operator to which the HSS or the edge node belongs, determining that the Diameter request message is received from the roaming interface.

Specifically, the IP address set may be stored in the HSS or the edge node.

For example, in an example of the present invention, if the HSS belongs to an operator B, the IP address set is a set of all IP addresses supported by the operator B.

Specifically, the IP address set may be all independent IP addresses such as an IP address 192.168.6.28 and an IP address 192.168.6.78; or may be an IP address segment, for example, 192.168.6.0 is used to indicate an IP address segment from 192.168.6.0 to 192.168.6.255.

It may be understood that, when IP addresses of the MME/SGSN and the HSS/edge node belong to a same network segment, it may be considered that communication between the MME/SGSN and the HSS/edge node is not roaming communication; or when the source IP address of the MME/SGSN belongs to the IP address set authorized by the operator to which the HSS/edge node belongs, it indicates that the MME/SGSN and the HSS/edge node belong to a same operator, in this case, communication between the MME/SGSN and the HSS/edge node is not roaming communication either. By means of determining that Diameter request message is received from the roaming interface, attack prevention processing may be performed only on the Diameter request message received from the roaming interface, and attack prevention efficiency is improved.

S503. When the Diameter request message is received from the roaming interface, determine whether a characteristic parameter of the Diameter request message is valid.

In some embodiments, the characteristic parameter of the Diameter request message includes at least one of the following items:

the source Internet Protocol (IP) address of the MME or the SGSN, a mobility management entity origin realm name, a mobility management entity origin host name, or a visited public land mobile network ID visited PLMN ID.

The source IP address of the MME or the SGSN and the visited PLMN ID may be used to identify an operator of the MME or the SGSN. For example, if the message is sent by the MME, the source IP address and the visited PLMN ID may be information that reflects the operator to which the MME belongs; for example, the source IP address is an IP address authorized by the operator B to which the MME belongs. The mobility management entity origin realm name and the mobility management entity origin host name may be physical terminal identifiers used to uniquely identify the MME or the SGSN.

In some embodiments, the Diameter request message may carry other information used to identify the operator to which the MME/SGSN belongs, and another physical terminal identifier used to identify the MME/SGSN.

S504. If the characteristic parameter of the Diameter request message is invalid, discard the Diameter request message or return, to the MME or the SGSN, a Diameter response message carrying an error code.

The error code may be used to indicate an invalidity type of the Diameter request message, that is, a reason why the HSS and/or the edge node refuse/refuses the Diameter request message.

In some embodiments, in an embodiment of the present invention, when the mobility management entity origin realm name in the Diameter request message is invalid, the error code indicates that the mobility management entity origin realm name is invalid;

when the mobility management entity origin host name in the Diameter request message is invalid, the error code indicates that the mobility management entity origin host name is invalid;

when the visited PLMN ID in the Diameter request message is invalid, the error code indicates that the visited PLMN ID is invalid; or when the mobility management entity origin realm name does not match the visited PLMN ID, the error code indicates that parameters do not match.

In some embodiments, if the characteristic parameter of the Diameter request message is valid, in this case, it indicates that the Diameter request message is valid. Therefore, in this case, normal service processing may be continued.

It can be learned that, in the solution in this embodiment, the HSS or the edge node receives the Diameter request message sent by the MME or the SGSN. When the Diameter request message is received from the roaming interface, the HSS or the edge node determines whether the characteristic parameter of the Diameter request message is valid; and when the characteristic parameter of the Diameter request message is invalid, the HSS or the edge node discards the Diameter request message or returns, to the MME or the SGSN, the Diameter response message carrying the error code. Therefore, a hacker can be effectively prevented from attacking the HSS or the edge node by using each attack path, and communication security is improved.

In some embodiments, in an embodiment of the present invention, the characteristic parameter includes the mobility management entity origin realm name.

The determining whether a characteristic parameter of the Diameter request message is valid includes:

determining whether the mobility management entity origin realm name belongs to a preset mobility management entity origin realm name set; and when the mobility management entity origin realm name does not belong to the preset mobility management entity origin realm name set, determining that the mobility management entity origin realm name in the Diameter request message is invalid.

In some embodiments, when the mobility management entity origin realm name in the Diameter request message belongs to the preset mobility management entity origin realm name set, it is determined that the mobility management entity origin realm name in the Diameter request message is valid.

In some embodiments, the preset mobility management entity origin realm name set may be pre-configured in the HSS or the edge node.

Further, specifically, a list of valid management node origin realm names may be configured in the HSS or the edge node. Then, whether the mobility management entity origin realm name in the Diameter request message is in the list is determined.

when the mobility management entity origin host name does not belong to the preset mobility management entity origin host name set, determining that the mobility management entity origin host name in the Diameter request message is invalid.

In some embodiments, when the mobility management entity origin host name in the Diameter request message belongs to the preset mobility management entity origin realm name set, it is determined that the mobility management entity origin host name in the Diameter request message is valid.

Specifically, the preset mobility management entity origin realm name set may be pre-configured in the HSS or the edge node.

Further, specifically, a list of valid mobility management entity origin host names may be configured in the HSS or the edge node. Then, whether the mobility management entity origin host name in the Diameter request message is in the list is determined.

Preferably, the following table may be configured in the HSS or the edge node. Then, whether the mobility management entity origin host name in the Diameter request message is in the following table is determined.

|   | Peer IP address | Peer realm name/host name | Peer PLMN ID |
|---|---|---|---|
| 1 | Peer IP address 1 | Peer realm name 1/host name 1 | Peer PLMN ID 1 |
| 2 | Peer IP address 2 | Peer realm name 2/host name 2 | Peer PLMN ID 12 |
| 3 | . . . | . . . | . . . |

The following table may be configured in the HSS or the edge node. Then, whether the mobility management entity origin realm name in the Diameter request message is in the following table is determined. The table includes IP addresses and PLMN IDs of all operators authorized by the HSS. For example, information about all other operators (such as France Telecom and a US telecom operator) that sign a roaming protocol needs to be pre-configured in an HSS of China Mobile.

It may be understood that, the mobility management entity origin host name can reflect a terminal identifier of the MME/SGSN, and therefore, by further determining a mobility management entity origin host name parameter in the Diameter request message, the attacker may be effectively prevented from launching an attack by using each attack path, and communication security is improved.

In some embodiments, in an embodiment of the present invention, the characteristic parameter includes the visited public land mobile network ID visited PLMN ID.

The determining whether a characteristic parameter of the Diameter request message is valid includes:

|   | Peer IP address | Peer realm name/host name | Peer PLMN ID |
|---|---|---|---|
| 1 | Peer IP address 1 | Peer realm name 1/host name 1 | Peer PLMN ID 1 |
| 2 | Peer IP address 2 | Peer realm name 2/host name 2 | Peer IP address 2 |
| 3 | . . . | . . . | . . . |

It may be understood that, the mobility management entity origin realm name can reflect a terminal identifier of the MME/SGSN, and therefore, by means of determining a mobility management entity origin realm name parameter in the Diameter request message, the attacker may be effectively prevented from launching an attack by using each attack path, and communication security is improved.

In some embodiments, in an embodiment of the present invention, the characteristic parameter includes the mobility management entity origin host name.

The determining whether a characteristic parameter of the Diameter request message is valid includes:

determining whether the mobility management entity origin host name belongs to a preset mobility management entity origin host name set; and determining whether the visited PLMN ID belongs to a preset visited PLMN ID set; and when the visited PLMN ID does not belong to the preset visited PLMN ID set, determining that the visited PLMN ID in the Diameter request message is invalid.

In some embodiments, when the visited PLMN ID in the Diameter request message belongs to the visited PLMN ID set, it is determined that the visited PLMN ID in the Diameter request message is valid.

Specifically, the preset visited PLMN ID set may be pre-configured in the HSS or the edge node.

Further, specifically, a list of valid visited PLMN IDs may be configured in the HSS or the edge node. Then, whether the visited PLMN ID in the Diameter request message is in the list is determined.

Preferably, the following table may be configured in the HSS or the edge node. Then, whether the visited PLMN ID in the Diameter request message is in the following table is determined.

|   | Peer IP address | Peer realm name/host name | Peer PLMN ID |
|---|---|---|---|
| 1 | Peer IP address 1 | Peer realm name 1/host name 1 | Peer PLMN ID 1 |
| 2 | Peer IP address 2 | Peer realm name 2/host name 2 | Peer PLMN ID 12 |
| 3 | ... | ... | ... |

It may be understood that, the visited PLMN ID can reflect the operator to which the MME/SGSN belongs, and therefore, by further determining whether a visited PLMN ID parameter in the Diameter request message is valid, the attacker may be effectively prevented from launching an attack by using each attack path, and communication security is improved.

In some embodiments, in an embodiment of the present invention, when the mobility management entity origin realm name and the visited PLMN ID are valid, before the discarding the Diameter request message or returning, to the MME or the SGSN, a Diameter response message carrying an error code, the method further includes:

determining whether the mobility management entity origin realm name matches the visited PLMN ID; and when the mobility management entity origin realm name does not match the visited PLMN ID, performing the step of discarding the Diameter request message or returning, to the MME, a Diameter response message carrying an error code.

That the mobility management entity origin realm name matches the visited PLMN ID means that when both the mobility management entity origin realm name and the visited PLMN ID are valid, the mobility management entity origin realm name and the visited PLMN ID belong to a same message source. When the two parameters do not belong to a same message source, the attacker may modify a parameter in the Diameter request message, and in this case, there may be a security risk.

For example, in an example of the present invention, if the MME has a mobility management entity origin realm name 1 and a visited PLMN ID 2 (which may be a visited PLMN ID authorized by the operator to which the MME belongs), and the visited PLMN ID is a visited PLMN ID 3, in this case, it may be determined that the mobility management entity origin realm name does not match the visited PLMN ID.

In some embodiments, when the mobility management entity origin realm name and the visited PLMN ID are valid, and the mobility management entity origin realm name matches the visited PLMN ID, it is determined that the Diameter request message is valid, and in this case, a normal service may be continued.

In some embodiments, in an embodiment of the present invention, the determining whether the mobility management entity origin realm name matches the visited PLMN ID includes:

determining whether the mobility management entity origin realm name and the visited PLMN ID have a mapping relationship in a mapping set of preset peer parameters, where the preset peer parameters include the mobility management entity origin realm name and the visited PLMN ID; and when the mobility management entity origin realm name and the visited PLMN ID have no mapping relationship in the mapping set of the preset peer parameters, determining that the mobility management entity origin realm name does not match the visited PLMN ID.

For example, the following table (the mapping set of the preset peer parameters) may be configured in the HSS or the edge node. Then, whether the source IP address and the visited PLMN ID in the Diameter request message are in a same row in the table is determined. For example, when both the mobility management entity origin realm name and the visited PLMN ID are in the first row, that is, are respectively the peer realm name 1 and the peer PLMN ID 1, it is determined that the mobility management entity origin realm name and the visited PLMN ID have no mapping relationship in the mapping set of the preset peer parameters. If the mobility management entity origin realm name is the peer realm name 1, and the visited PLMN ID is the peer PLMN ID 2, it can be learned from the following table that, the mobility management entity origin realm name and the visited PLMN ID have no mapping relationship. In this case, it may be determined that the mobility management entity origin realm name does not match the visited PLMN ID.

|   | Peer IP address | Peer realm name/host name | Peer PLMN ID |
|---|---|---|---|
| 1 | Peer IP address 1 | Peer realm name 1/host name 1 | Peer PLMN ID 1 |
| 2 | Peer IP address 2 | Peer realm name 2/host name 2 | Peer PLMN ID 12 |
| 3 | ... | ... | ... |

In some embodiments, in an embodiment of the present invention, when the mobility management entity origin realm name and the visited PLMN ID have a mapping relationship in the mapping set of the preset peer parameters, it is determined that the mobility management entity origin realm name matches the visited PLMN ID, and in this case, a normal service may be continued.

It may be understood that, by means of further determining whether the mobility management entity origin realm name matches the visited PLMN ID, the attacker can be more effectively prevented from performing attack by using the Diameter request message, and communication security is improved.

To better understand and implement the foregoing solutions in the embodiments of the present invention, the following further describes the embodiments of the present invention with reference to FIG. 5.

Figure 6:
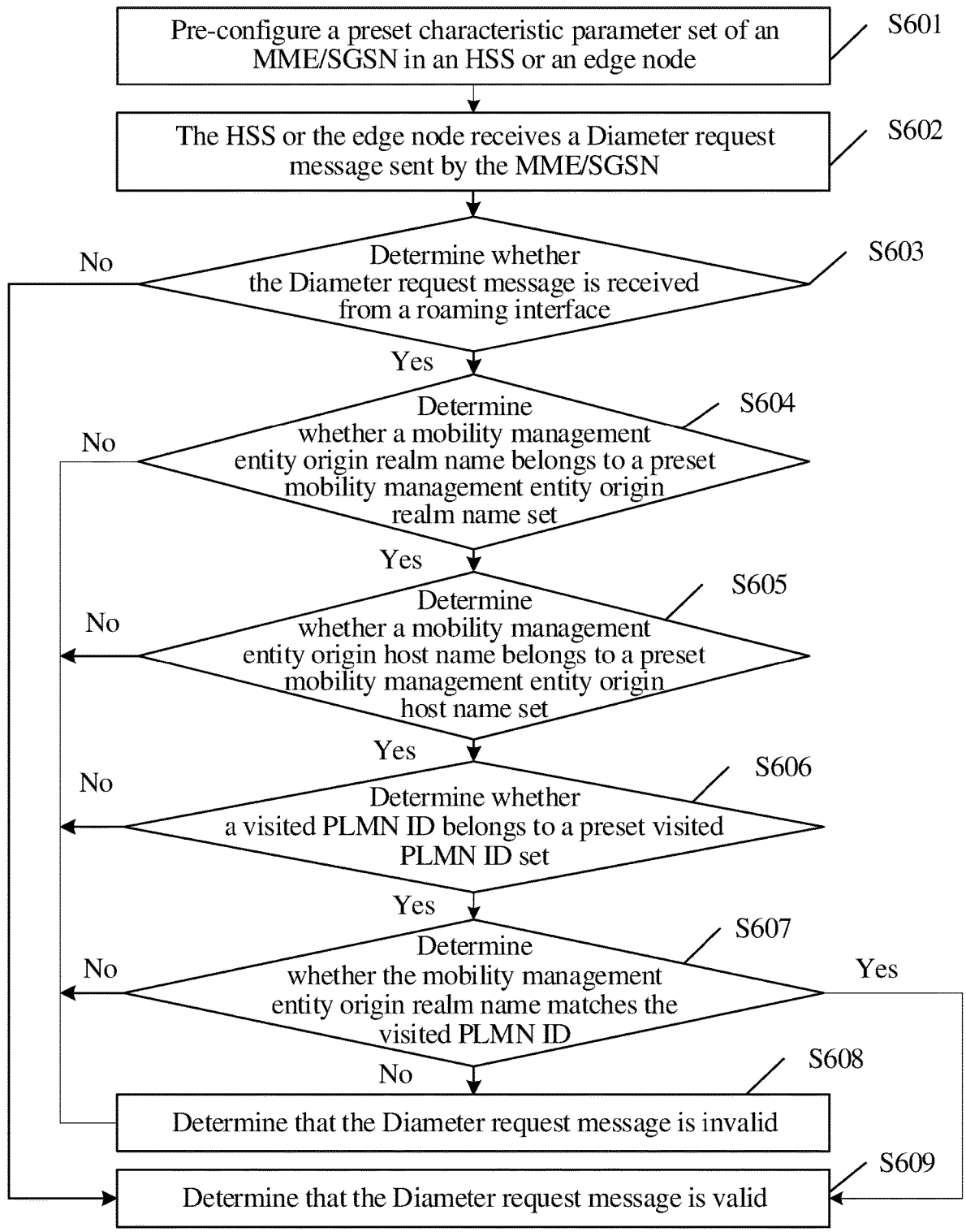
FIG. 6 is a schematic flowchart of another signaling attack prevention method according to an embodiment of the present invention.

Referring to FIG. 6, FIG. 6 is a schematic flowchart of another signaling attack prevention method according to an embodiment of the present invention. In the method shown in FIG. 6, for content that is the same as or similar to that in the method shown in FIG. 5, refer to detailed descriptions in FIG. 5, and details are not described herein again. As shown in FIG. 6, the method may include the following steps.

S601. Pre-configure a preset characteristic parameter set of an MME/SGSN in an HSS or an edge node.

Specifically, a preset characteristic parameter list (a peer IP address, a peer realm name/peer host name, a peer PLMN ID) of an MME/SGSN authorized by the HSS or the edge node may be configured.

S602. The HSS or the edge node receives a Diameter request message sent by the MME/SGSN.

In some embodiments, the Diameter request message includes at least one of the following items:

a source IP address of the MME or the SGSN, a mobility management entity origin realm name, a mobility management entity origin host name, or a visited PLMN ID.

S603. Determine whether the Diameter request message is received through a roaming interface.

In some embodiments, when the Diameter request message is received from the roaming interface, step S604 is performed.

In some embodiments, when the Diameter request message is not received from the roaming interface, step S609 is performed.

S604. Determine whether a mobility management entity origin realm name belongs to a preset mobility management entity origin realm name set.

In some embodiments, when the mobility management entity origin realm name belongs to the preset mobility management entity origin realm name set, step S605 is performed.

In some embodiments, when the mobility management entity origin realm name does not belong to the preset mobility management entity origin realm name set, step S608 is performed.

S605. Determine whether a mobility management entity origin host name belongs to a preset mobility management entity origin host name set.

In some embodiments, when the mobility management entity origin host name belongs to the preset mobility management entity origin host name set, step S606 is performed.

In some embodiments, when the mobility management entity origin host name does not belong to the preset mobility management entity origin host name set, step S608 is performed.

S606. Determine whether a visited PLMN ID belongs to a preset visited PLMN ID set.

In some embodiments, when the visited PLMN ID belongs to the preset visited PLMN ID set, step S607 is performed.

In some embodiments, when the visited PLMN ID does not belong to the preset visited PLMN ID set, step S608 is performed.

S607. Determine whether the mobility management entity origin realm name matches the visited PLMN ID.

In this embodiment of the present invention, when both the mobility management entity origin realm name and the visited PLMN ID are valid, that is, when determining results in both step S604 and step S606 are yes, the step of determining whether the mobility management entity origin realm name matches the visited PLMN ID is performed.

In some embodiments, when the mobility management entity origin realm name matches the visited PLMN ID, step S609 is performed.

In some embodiments, when the mobility management entity origin realm name does not match the visited PLMN ID, step S608 is performed.

S608. Determine that the Diameter request message is invalid.

In this embodiment of the present invention, in this case, the HSS and/or the edge node discard/discards the Diameter request message or return, to the MME or the SGSN, a Diameter response message carrying an error code.

S609. Determine that the Diameter request message is valid.

In this embodiment of the present invention, in this case, the HSS and/or the edge node continue/continues a normal service.

It can be learned that, in the solution in this embodiment, the HSS or the edge node receives the Diameter request message sent by the MME or the SGSN. When the Diameter request message is received from the roaming interface, the HSS or the edge node determines whether the characteristic parameter of the Diameter request message is valid; and when the characteristic parameter of the Diameter request message is invalid, the HSS or the edge node discards the Diameter request message or returns, to the MME or the SGSN, the Diameter response message carrying the error code. Therefore, a hacker can be effectively prevented from attacking the HSS or the edge node by using each attack path, and communication security is improved.

It should be noted that, the foregoing steps S603 to S607 are optional steps, and there is no strict execution sequence among steps S603 to S606. For example, step S606 may be performed before step S604 is performed. However, step S607 may be performed only when the determining results in step S604 and step S606 are yes.

It can be learned that, in the solution in this embodiment, the HSS or the edge node receives the Diameter request message sent by the MME or the SGSN. When the Diameter request message is received from the roaming interface, the HSS or the edge node determines whether the characteristic parameter of the Diameter request message is valid; and when the characteristic parameter of the Diameter request message is invalid, the HSS or the edge node discards the Diameter request message or returns, to the MME or the SGSN, the Diameter response message carrying the error code. Therefore, a hacker can be effectively prevented from attacking the HSS or the edge node by using each attack path, and communication security is improved.

Figure 7:
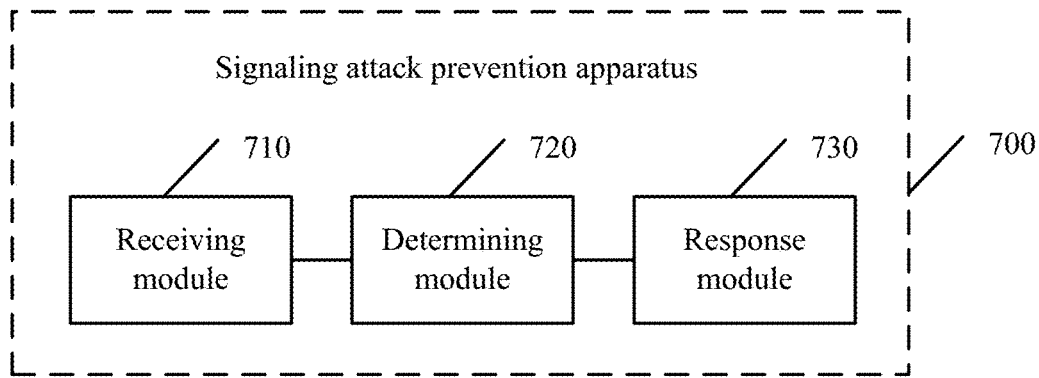
FIG. 7 is a schematic structural diagram of a signaling attack prevention apparatus according to an embodiment of the present invention.

Referring to FIG. 7, FIG. 7 is a schematic structural diagram of a signaling attack prevention apparatus according to an embodiment of the present invention. The signaling attack prevention apparatus is configured to implement the signaling attack prevention method disclosed in the embodiments of the present invention. As shown in FIG. 7, the signaling attack prevention apparatus 700 provided in this embodiment of the present invention may include:

a receiving module 710, a determining module 720, and a response module 730.

The receiving module 710 is configured to receive a Diameter request message sent by a mobility management entity (MME) or a serving general packet radio service (GPRS) support node (SGSN).

In this embodiment of the present invention, the signaling attack prevention apparatus 700 may be specifically an HSS and/or an edge node. Therefore, the Diameter request message sent by the MME/SGSN may be received by the HSS and/or the edge node.

The edge node refers to a firewall that is located at a border of a security domain and that communicates with network elements in two neighboring security domains.

Specifically, in this embodiment of the present invention, the Diameter request message may include at least one of the following messages:

an authentication information retrieval AIR message, an update location request ULR message, a notify request NOR message, or a purge request PUR message.

The determining module 720 is configured to determine whether the Diameter request message is received through a roaming interface.

In some embodiments, in an embodiment of the present invention, the characteristic parameter includes a source Internet Protocol (IP) address of the MME or the SGSN.

That the determining module 720 determines whether the Diameter request message is received through a roaming interface is specifically:

determining whether the source IP address and an IP address of a home subscriber server (HSS) or an edge node that receives the Diameter request message belong to a same network segment; and when the source IP address and the IP address of the HSS or the edge node that receives the Diameter request message do not belong to a same network segment, determining that the Diameter request message is received from the roaming interface; or determining whether the source IP address belongs to an IP address set authorized by an operator to which the HSS or the edge node belongs; and when the source IP address does not belong to the IP address set authorized by the operator to which the HSS or the edge node belongs, determining that the Diameter request message is received from the roaming interface.

Specifically, the IP address set may be stored in the HSS or the edge node.

The determining module 720 is further configured to: when the Diameter request message is received from the roaming interface, determine whether a characteristic parameter of the Diameter request message is valid.

In some embodiments, the characteristic parameter of the Diameter request message includes at least one of the following items:

the source Internet Protocol (IP) address of the MME or the SGSN, a mobility management entity origin realm name, a mobility management entity origin host name, or a visited public land mobile network ID visited PLMN ID.

The response module 730 is configured to: if the characteristic parameter of the Diameter request message is invalid, discard the Diameter request message or return, to the MME or the SGSN, a Diameter response message carrying an error code.

The error code may be used to indicate an invalidity type of the Diameter request message, that is, a reason why the HSS and/or the edge node refuse/refuses the Diameter request message.

In some embodiments, in an embodiment of the present invention, when the mobility management entity origin realm name in the Diameter request message is invalid, the error code indicates that the mobility management entity origin realm name is invalid;

when the mobility management entity origin host name in the Diameter request message is invalid, the error code indicates that the mobility management entity origin host name is invalid;

when the visited PLMN ID in the Diameter request message is invalid, the error code indicates that the visited PLMN ID is invalid; or when the mobility management entity origin realm name does not match the visited PLMN ID, the error code indicates that parameters do not match.

In some embodiments, if the characteristic parameter of the Diameter request message is valid, in this case, it indicates that the Diameter request message is valid. Therefore, in this case, normal service processing may be continued.

In some embodiments, in an embodiment of the present invention, the characteristic parameter includes the mobility management entity origin realm name.

That the determining module 720 determines whether a characteristic parameter of the Diameter request message is valid is specifically:

determining whether the mobility management entity origin realm name belongs to a preset mobility management entity origin realm name set; and when the mobility management entity origin realm name does not belong to the preset mobility management entity origin realm name set, determining that the mobility management entity origin realm name in the Diameter request message is invalid.

In some embodiments, when the mobility management entity origin realm name in the Diameter request message belongs to the preset mobility management entity origin realm name set, it is determined that the mobility management entity origin realm name in the Diameter request message is valid.

Specifically, the preset mobility management entity origin realm name set may be pre-configured in the HSS or the edge node.

In some embodiments, in an embodiment of the present invention, the characteristic parameter includes the mobility management entity origin host name.

That the determining module 720 determines whether a characteristic parameter of the Diameter request message is valid is specifically:

determining whether the mobility management entity origin host name belongs to a preset mobility management entity origin host name set; and when the mobility management entity origin host name does not belong to the preset mobility management entity origin host name set, determining that the mobility management entity origin host name in the Diameter request message is invalid.

In some embodiments, when the mobility management entity origin host name in the Diameter request message belongs to the preset mobility management entity origin realm name set, it is determined that the mobility management entity origin host name in the Diameter request message is valid.

Specifically, the preset mobility management entity origin realm name set may be pre-configured in the HSS or the edge node.

In some embodiments, in an embodiment of the present invention, the characteristic parameter includes the visited public land mobile network ID visited PLMN ID.

That the determining module 720 determines whether a characteristic parameter of the Diameter request message is valid is specifically:

determining whether the visited PLMN ID belongs to a preset visited PLMN ID set; and when the visited PLMN ID does not belong to the preset visited PLMN ID set, determining that the visited PLMN ID in the Diameter request message is invalid.

In some embodiments, when the visited PLMN ID in the Diameter request message belongs to the visited PLMN ID set, it is determined that the visited PLMN ID in the Diameter request message is valid.

Specifically, the preset visited PLMN ID set may be pre-configured in the HSS or the edge node.

In some embodiments, in an embodiment of the present invention, when the mobility management entity origin realm name and the visited PLMN ID are valid, the determining module 720 is further configured to determine whether the mobility management entity origin realm name matches the visited PLMN ID; and when the determining module 720 determines that the mobility management entity origin realm name does not match the visited PLMN ID, the response module 730 performs the step of discarding the Diameter request message or returning, to the MME, a Diameter response message carrying an error code.

In some embodiments, when the mobility management entity origin realm name and the visited PLMN ID are valid, and the mobility management entity origin realm name matches the visited PLMN ID, it is determined that the Diameter request message is valid, and in this case, a normal service may be continued.

In some embodiments, in an embodiment of the present invention, that the determining module 720 determines whether the mobility management entity origin realm name matches the visited PLMN ID is specifically:

determining whether the mobility management entity origin realm name and the visited PLMN ID have a mapping relationship in a mapping set of preset peer parameters, where the preset peer parameters include the mobility management entity origin realm name and the visited PLMN ID; and when the mobility management entity origin realm name and the visited PLMN ID have no mapping relationship in the mapping set of the preset peer parameters, determining that the mobility management entity origin realm name does not match the visited PLMN ID.

In some embodiments, in an embodiment of the present invention, when the mobility management entity origin realm name and the visited PLMN ID have a mapping relationship in the mapping set of the preset peer parameters, it is determined that the mobility management entity origin realm name matches the visited PLMN ID, and in this case, a normal service may be continued.

It can be learned that, in the solution in this embodiment, the signaling attack prevention apparatus 700 (which is specifically the HSS or the edge node) receives the Diameter request message sent by the MME or the SGSN. When the Diameter request message is received from the roaming interface, the HSS or the edge node determines whether the characteristic parameter of the Diameter request message is valid; and when the characteristic parameter of the Diameter request message is invalid, the HSS or the edge node discards the Diameter request message or returns, to the MME or the SGSN, the Diameter response message carrying the error code. Therefore, a hacker can be effectively prevented from attacking the HSS or the edge node by using each attack path, and communication security is improved.

In this embodiment, the signaling attack prevention apparatus 700 is presented in a form of a unit. The "unit" herein may refer to an application-specific integrated circuit (application-specific integrated circuit, ASIC), a processor and a memory that execute one or more software or firmware programs, an integrated logic circuit, and/or another component that can provide the foregoing functions.

It may be understood that functions of the function units of the signaling attack prevention apparatus 700 in this embodiment may be specifically implemented according to the methods in the foregoing method embodiments. For a specific implementation process, refer to related descriptions in the foregoing method embodiments, and details are not described herein.

Figure 8:
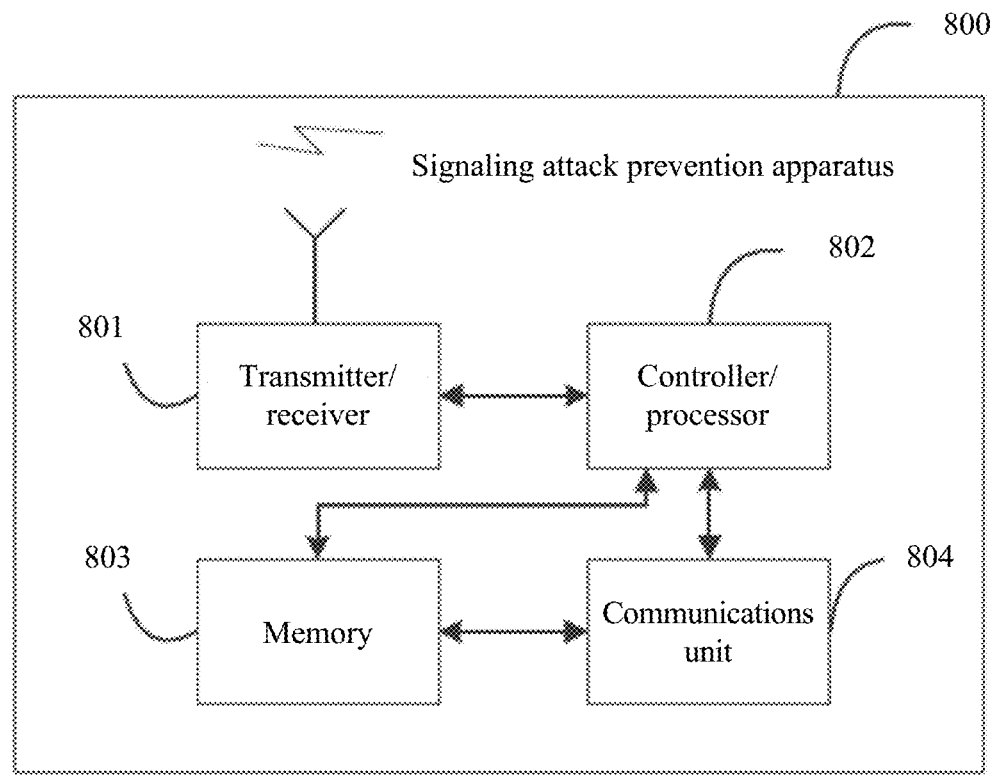
FIG. 8 is a schematic structural diagram of another signaling attack prevention apparatus according to an embodiment of the present invention.

Referring to FIG. 8, FIG. 8 is a schematic structural diagram of another signaling attack prevention apparatus according to an embodiment of the present invention. As shown in FIG. 8, the signaling attack prevention apparatus 800 includes:

a transmitter/receiver 801 and a processor 802. The processor 802 may also be a controller, and is indicated as a "controller/processor 802" in FIG. 8. The transmitter/receiver 801 is configured to: support the signaling attack prevention apparatus 800 (which may be specifically an HSS or an edge node) in sending/receiving information to/from the MME or the SGSN in the foregoing embodiment, and support the HSS or the edge node in performing radio communication with another device. The processor 802 executes various functions used to communicate with the signaling attack prevention apparatus 800. On an uplink, an uplink signal from the MME or the SGSN is received by using an antenna, is demodulated (for example, a high frequency signal is demodulated into a baseband signal) by the transmitter/receiver 801, and is then processed by the processor 802, to restore service data and signaling information sent to the signaling attack prevention apparatus 800. On a downlink, the service data and the signaling message are processed by the processor 802, and are modulated (for example, a baseband signal is modulated into a high frequency signal) by the transmitter/receiver 801, to generate a downlink signal, and the downlink signal is transmitted to the HSS or the edge node by using the antenna. It should be noted that the foregoing demodulation or modulation function may be implemented by the processor 802. For example, the processor 802 is further configured to perform corresponding steps in the method embodiments, and/or another process in the technical solution described in this embodiment of the present invention.

Further, the signaling attack prevention apparatus 800 may further include a memory 803, and the memory 803 is configured to store program code and data of the signaling attack prevention apparatus 800. In addition, the signaling attack prevention apparatus 800 may further include a communications unit 804. The communications unit 804 is configured to support the signaling attack prevention apparatus in communicating with another network entity (for example, a network device in a core network). For example, in an LTE system, the communications unit 804 may be an S1-MME interface, and be configured to support the signaling attack prevention apparatus in communicating with a mobility management entity (Mobility Management Entity, MME).

It may be understood that, FIG. 8 shows merely a simplified design of the signaling attack prevention apparatus 800. In actual application, the signaling attack prevention apparatus 800 may include any quantities of transmitters, receivers, processors, controllers, memories, and communications units. All signaling attack prevention apparatuses that can implement the embodiments of the present invention fall within the protection scope of the embodiments of the present invention.

An embodiment of the present invention further provides a computer storage medium. The computer storage medium may store a program; and when the program is executed, some or all steps of any signaling attack prevention method in the foregoing method embodiments are performed.

It should be noted that, to make the description brief, the foregoing method embodiments are expressed as a series of actions. However, persons skilled in the art should appreciate that the present invention is not limited to the described action sequence, because according to the present invention, some steps may be performed in other sequences or performed simultaneously. In addition, persons skilled in the art should also appreciate that all the embodiments described in the specification are example embodiments, and the related actions and modules are not necessarily mandatory to the present invention.

In the foregoing embodiments, the description of each embodiment has respective focuses. For a part that is not described in detail in an embodiment, reference may be made to related descriptions in other embodiments.

In the several embodiments provided in the present invention, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, function units in the embodiments of the present invention may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a read-only memory (ROM, Read-Only Memory), a random access memory (RAM, Random Access Memory), a removable hard disk, a magnetic disk, or an optical disc.

What is claimed is:

1. A signaling attack prevention method, wherein the method comprises:
    receiving, by a receiving node, Diameter request message sent by a mobility management entity (MME) or a serving general packet radio service (GPRS) support node (SGSN);
    determining whether the Diameter request message is received through a roaming interface, wherein the roaming interface is an interface between the receiving node, and the MME or the GPRS SGSN such that the receiving node and, the MME, or the GPRS SGSN belong to different operators;
    when the Diameter request message is received from the roaming interface, determining whether a characteristic parameter of the Diameter request message is valid; and
    if the characteristic parameter of the Diameter request message is invalid, discarding the Diameter request message or returning, to the MME or the SGSN, a Diameter response message carrying an error code; and, wherein the characteristic parameter comprises a visited public land mobile network (PLMN) ID and a mobility management entity origin realm name; and, wherein determining whether the characteristic parameter of the Diameter request message is valid comprises:
    determining whether the visited PLMN ID belongs to a preset visited PLMN ID set; and
    determining whether the mobility management entity origin realm name belongs to a preset mobility management entity origin realm name set; and, wherein
    when the visited PLMN ID does not belong to the preset visited PLMN ID set, determining that the visited PLMN ID in the Diameter request message is invalid; and
    when the mobility management entity origin realm name does not belong to the preset mobility management entity origin realm name set, determining that the mobility management entity origin realm name in the Diameter request message is invalid; and, wherein
    when the mobility management entity origin realm name and the visited PLMN ID are determined to be valid, before discarding the Diameter request message, or returning, to the MME or the SGSN, a Diameter response message carrying an error code, the method further comprises: determining whether the mobility management entity origin realm name matches the visited PLMN ID; and
    when the mobility management entity origin realm name does not match the visited PLMN ID, performing discarding the Diameter request message, or returning, to the MME, a Diameter response message carrying an error code.

2. The method according to claim 1, wherein the characteristic parameter comprises a source Internet Protocol (IP) address of the MME or the SGSN; and
    determining whether the Diameter request message is received through the roaming interface comprises:
    determining whether the source IP address, and an IP address of a home subscriber server (HSS) or an edge node that receives the Diameter request message belong to a same network segment; and
    when the source IP address, and the IP address of the HSS or the edge node that receives the Diameter request message do not belong to a same network segment, determining that the Diameter request message is received from the roaming interface; or
    determining whether the source IP address belongs to an IP address set authorized by an operator to which an HSS or an edge node belongs; and when the source IP address does not belong to the IP address set authorized by the operator to which the HSS or the edge node belongs, determining that the Diameter request message is received from the roaming interface.

3. The method according to claim 1, wherein the characteristic parameter comprises a mobility management entity origin host name; and, wherein
determining whether the characteristic parameter of the Diameter request message is valid comprises:
determining whether the mobility management entity origin host name belongs to a preset mobility management entity origin host name set; and
when the mobility management entity origin host name does not belong to the preset mobility management entity origin host name set, determining that the mobility management entity origin host name in the Diameter request message is invalid.

4. The method according to claim 1, wherein determining whether the mobility management entity origin realm name matches the visited PLMN ID comprises:
determining whether the mobility management entity origin realm name and the visited PLMN ID have a mapping relationship in a mapping set of preset peer parameters, wherein the preset peer parameters comprise the mobility management entity origin realm name and the visited PLMN ID; and
when the mobility management entity origin realm name and the visited PLMN ID have no mapping relationship in the mapping set of the preset peer parameters, determining that the mobility management entity origin realm name does not match the visited PLMN ID.

5. A signaling attack prevention apparatus, wherein the apparatus comprises:
a receiver, configured to receive a Diameter request message sent by a mobility management entity (MME) or a serving general packet radio service (GPRS) support node (SGSN); and
a processor configured to:
determine whether the Diameter request message is received through a roaming interface, wherein the roaming interface is an interface between the signaling attack prevention apparatus, and the MME or the GPRS SGSN such that the signaling attack prevention apparatus and, the MME or the GPRS SGSN belong to different operators;
when the Diameter request message is received from the roaming interface, determine whether a characteristic parameter of the Diameter request message is valid; and
if the characteristic parameter of the Diameter request message is invalid, discarding the Diameter request message or returning, to the MME or the SGSN, a Diameter response message carrying an error code; and, wherein the characteristic parameter comprises a visited public land mobile network (PLMN) ID and a mobility management entity origin realm name; and, wherein determining whether the characteristic parameter of the Diameter request message is valid comprises:
determining whether the visited PLMN ID belongs to a preset visited PLMN ID set; and
determining whether the mobility management entity origin realm name belongs to a preset mobility management entity origin realm name set; and, wherein
when the visited PLMN ID does not belong to the preset visited PLMN ID set, determining that the visited PLMN ID in the Diameter request message is invalid; and when the mobility management entity origin realm name does not belong to the preset mobility management entity origin realm name set, determining that the mobility management entity origin realm name in the Diameter request message is invalid; and, wherein
when the mobility management entity origin realm name and the visited PLMN ID are determined to be valid, before discarding the Diameter request message, or returning, to the MME or the SGSN, a Diameter response message carrying an error code, the processor is further configured to: determine whether the mobility management entity origin realm name matches the visited PLMN ID; and
when the mobility management entity origin realm name does not match the visited PLMN ID, perform discarding the Diameter request message, or return, to the MME, a Diameter response message carrying an error code.

6. The apparatus according to claim 5, wherein the characteristic parameter comprises a source Internet Protocol (IP) address of the MME or the SGSN; and
determining, by the processor, whether the Diameter request message is received through the roaming interface comprises: determining whether the source IP address, and an IP address of a home subscriber server (HSS) or an edge node that receives the Diameter request message belong to a same network segment; and
when the source IP address and the IP address of the HSS or the edge node that receives the Diameter request message do not belong to a same network segment, determining that the Diameter request message is received from the roaming interface; or
determining whether the source IP address belongs to an IP address set authorized by an operator to which the HSS or the edge node belongs; and when the source IP address does not belong to the IP address set authorized by the operator to which the HSS or the edge node belongs, determining that the Diameter request message is received from the roaming interface.

7. The apparatus according to claim 5, wherein the characteristic parameter comprises a mobility management entity origin host name; and, wherein
determining, by the processor, whether a characteristic parameter of the Diameter request message is valid comprises:
determining whether the mobility management entity origin host name belongs to a preset mobility management entity origin host name set; and
when the mobility management entity origin host name does not belong to the preset mobility management entity origin host name set, determining that the mobility management entity origin host name in the Diameter request message is invalid.

8. The apparatus according to claim 5, wherein determining, by the processor, whether the mobility management entity origin realm name matches the visited PLMN ID comprises:
determining whether the mobility management entity origin realm name and the visited PLMN ID have a mapping relationship in a mapping set of preset peer parameters, wherein the preset peer parameters comprise the mobility management entity origin realm name and the visited PLMN ID; and when the mobility management entity origin realm name and the visited PLMN ID have no mapping relationship in the mapping set of the preset peer parameters, determining that the mobility management entity origin realm name does not match the visited PLMN ID.

\* \* \* \* \*